(12) United States Patent
Best et al.

(10) Patent No.: US 6,736,870 B2
(45) Date of Patent: May 18, 2004

(54) FILTER DEVICE

(75) Inventors: Walter Best, Duren (DE); Uwe Schumacher, Tonisvorst (DE)

(73) Assignee: Thomas Josef Heimbach Gesellschaft mit beschrankter Haftung, Duren (DE)

( * ) Notice: Subject to any disclaimer, the term of this patent is extended or adjusted under 35 U.S.C. 154(b) by 0 days.

(21) Appl. No.: 09/965,089

(22) Filed: Sep. 28, 2001

(65) Prior Publication Data

US 2002/0038536 A1 Apr. 4, 2002

(51) Int. Cl.[7] .......................... B01D 46/00; B01D 46/42
(52) U.S. Cl. .......................... 55/282.3; 55/284; 55/483; 55/484; 55/523; 55/DIG. 10; 55/DIG. 30
(58) Field of Search .............................. 55/282.1, 282.2, 55/282.3, 284, 483, 484, 523, DIG. 10, DIG. 30; 60/303, 311

(56) References Cited

U.S. PATENT DOCUMENTS

| | | | |
|---|---|---|---|
| 4,505,107 A | | 3/1985 | Yamaguchi et al. .......... 60/303 |
| 4,811,559 A | * | 3/1989 | Henkel ........................ 60/303 |
| 4,813,231 A | * | 3/1989 | Bykowski .............. 55/DIG. 30 |
| 5,202,548 A | * | 4/1993 | Kondo et al. .......... 55/DIG. 30 |
| 5,207,807 A | | 5/1993 | Manfre et al. ................. 55/269 |
| 5,259,190 A | * | 11/1993 | Bagley et al. ................. 55/523 |
| 5,294,411 A | * | 3/1994 | Breuer et al. ................. 55/524 |
| 5,393,586 A | * | 2/1995 | Lipp .......................... 428/116 |
| 5,423,904 A | * | 6/1995 | Dasgupta ...................... 55/523 |
| 5,449,541 A | * | 9/1995 | Lipp et al. .................. 428/116 |
| 5,465,573 A | * | 11/1995 | Abe et al. .............. 55/DIG. 30 |

FOREIGN PATENT DOCUMENTS

| | | |
|---|---|---|
| EP | 0 796 830 | 9/1997 |
| EP | 0943593 | 9/1999 |
| EP | 1 013 328 | 6/2000 |
| WO | WO 93/13303 | 7/1993 |

* cited by examiner

*Primary Examiner*—Duane Smith
*Assistant Examiner*—Jason M. Greene
(74) *Attorney, Agent, or Firm*—Liniak, Berenato & White, LLC.

(57) ABSTRACT

The invention describes a filter device having filter elements (2 through 6; 12 through 20; 22 through 25) made of ceramic material which are combined into at least one filter element group (1, 11, 21) in which the filter elements (2 through 6, 12 through 20; 22 through 25) lie side by side next to one another and can be flowed through in parallel, which is characterized in that only some of the filter elements (2, 12, 22, 23) of each filter element group (1, 11, 21) have electrical terminals for connection with an electrical energy source, and at least that/those filter element(s) (2, 12, 22, 23) is/are made of electrically conductive ceramic material.

30 Claims, 3 Drawing Sheets

FILTER DEVICE

CROSS REFERENCE TO RELATED APPLICATIONS

Applicants claim priority to German patent application 200 16 803.7 filed Sep. 29, 2000.

BACKGROUND OF THE INVENTION

1. Field of the Invention

The invention concerns a filter device having filter elements made of ceramic material which are combined into at least one filter element group in which the filter elements lie side by side next to one another and can be flowed through in parallel.

2. Description of the Related Art

For hot gas filtration, for example the filtration of diesel engine exhaust gases, increasing use is being made of filter elements made of porous ceramic material; particularly successful here is the SiC ceramic material that is described in EP 796 830 A1. It is chemically stable and has high thermal conductivity, temperature resistance, and thermal shock resistance. As is evident from WO 93/13303 and EP 1 013 328 A2, filter elements of this kind are combined into one filter element group or several of them, in which the filter elements lie side by side next to one another and are flowed through in parallel. Located between the filter elements are contact layers made of material expanded by the action of heat. The filter element groups are surrounded by housings that can also be replaceable.

For use on diesel engines, it is important for the soot particles deposited on or in the filter element to be removed at regular intervals so that the flow-through resistance, in particular in the filtrationally effective walls of the filter element, does not become too high. One known cleaning method consists in heating the filter elements, by application of an electric current, to such an extent that the soot particles ignite and burn off (cf. WO 93/13303, EP 0 943 593 A1). For this purpose, the ceramic material can be given a suitable electrical resistance (cf. EP 0 796 830 A1). Particular electrical terminals—as described, for example, in EP 0 943 593 A1—are necessary to ensure current transfer with as little resistance as possible.

U.S. Pat. No. 4,505,107 describes a filter device that contains, in a filter housing, a filter element made of porous ceramic foam. Provided on its end face is a heating device that comprises a heating grid made of electrically conductive ceramic material that is equipped with a plurality of electrical terminals, each two terminals being connected to an electrical circuit. In this fashion, the heating grid can be acted upon by current, and thus heated, sequentially in sections. Instead of the heating grid it is also possible to provide a plurality of heating elements with a ceramic coating, distributed over the end surface of the filter element, which are also acted upon sequentially by electric current.

Electrical cleaning or regeneration results in a not inconsiderable installation and control outlay. Efforts are therefore being made to dispense with this type of cleaning and to perform cleaning by way of the exhaust gas itself, for example by elevating the exhaust gas temperature or by artificially generating $NO_2$ that transforms the soot, by higher oxidation, substantially into $CO_2$. This type of cleaning cannot, however, be reliably achieved in all operating states. In particular at low engine speeds, under low load, or in short-distance driving, the exhaust gas cannot be conditioned so as to bring about combustion of the soot. If these operating conditions persist for a long period, they can cause clogging or at least a considerable exhaust back pressure that results in decreased performance and increased fuel consumption.

SUMMARY OF THE INVENTION

It is therefore the object of the invention to configure a filter device of the kind cited initially in such a way that soot cleaning is possible even under operating conditions in which cleaning by way of the exhaust gas is not successful.

This object is achieved, according to the present invention, in that only some of the filter elements of each filter element group have electrical terminals for connection with an electrical energy source, and at least that/those partial element(s) is/are made of electrically conductive ceramic material.

The basic idea of the invention is thus to provide electrical cleaning but to limit it to some of the filter elements and accordingly to keep the outlay for equipment comparatively low. This is based on the consideration, already belonging to the invention, that the exhaust gas volume is low in precisely those operating states in which combustion of the carbon by way of the exhaust gas is not successful, and accordingly even a partial cleaning is sufficient to ensure a sufficiently low exhaust gas pressure. Complete regeneration occurs when the diesel engine has warmed up and greater load states are demanded. The two cleaning methods thus complement one another with little additional outlay for equipment. For the other filter elements, furthermore, their electrical conductivity does not need to be taken into account.

In an embodiment of the invention, provision is made for the first filter element(s) to be arranged at the center, since energy conversion there is particularly effective. The possibility also exists, however, for the first filter elements to be arranged in distributed fashion in the filter element group, greater flexibility being thereby achievable. In this case the possibility exists of cleaning the filter elements alternatingly by way of a corresponding circuit.

The invention does not exclude the fact that the second filter elements are also made of electrically conductive ceramic material. This is a good choice in particular if the second filter elements resting against the first filter element(s) are in electrically conductive contact with the first filter element(s). Concurrent heating of the second filter elements can thereby be brought about. By appropriately designing the electrical conductivity of the first and second filter elements and the transition between the two, the concurrent heating can be adapted in customized fashion to respective conditions. The possibility also exists, however, of producing the second filter elements from an electrically nonconductive material, if active concurrent heating is not desired. In that case concurrent heating is brought about by thermal conduction.

According to a further feature of the invention, provision is made for the thermal conductivity of the second filter elements to be greater than or less than that of the first filter element or elements. The concurrent heating of the second filter elements can thereby be adjusted accordingly.

The filter elements can be arranged in direct contact with one another. For an assemblage, it is advisable to arrange contact layers between the filter elements. The electrical and thermal resistance can be influenced to the particular degree desired by way of the material and thickness of the contact layers. Contact layers that are made of the same ceramic base material as the filter elements are particularly suitable for this purpose.

If concurrent heating is desired, the contact layers can be designed to be electrically conductive. Contact layers like those described in EP 0 943 593 A1 have proven successful. The electrical conductivity of the contact layers should be lower than that of the first filter elements.

The contact layers can be configured in such a way that they directly connect the filter elements. Separate contact layers with no material connection to the filter elements can, however, also be provided. In that case the filter elements are held together by a housing that surrounds them.

The thermal conductivity of the contact layers can be of the same order of magnitude as that of the first or second filter elements.

According to a further feature of the invention, provision is made for the filter elements to comprise, next to and alternating with one another, inflow conduits and outflow conduits that are separated by porous, filtrationally effective longitudinal walls, the inflow conduits being open on the inflow side and closed on the outflow side, and the outflow conduits being closed on the inflow side and open on the outflow side. Inflow and outflow conduits having a rectangular, in particular square, cross section have proven successful. In this context, the outer walls of the filter elements should be of particle-tight, in particular gas-tight, configuration. The filter elements can have a rectangular, square, oval, round, and/or shell-shaped cross section.

The filter element group(s) is/are advantageously surrounded by a housing having a gas inlet and gas outlet; each filter element group can be surrounded by a separate housing if multiple filter element groups are present A corresponding embodiment is evident, for example, from EP 1 013 328 A2.

The invention is illustrated in more detail, with reference to exemplary embodiments, in the drawings, in which:

DETAILED DESCRIPTION OF THE PREFERRED EMBODIMENTS

Figure 1:
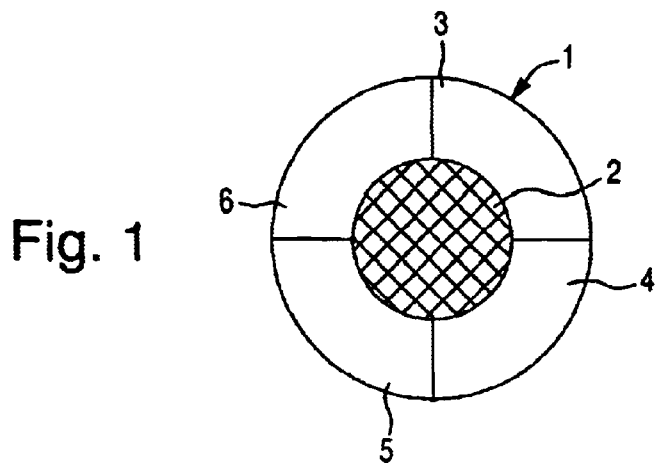
FIG. 1 shows a first filter element group in an end view.

Filter element group 1 depicted in FIG. 1 comprises a first filter element 2, found in cross section and made of an electrically conductive ceramic material, that is surrounded by four shell-shaped second filter elements 3, 4, 5, 6 made of ceramic material. Flow through all the filter elements 2, 3, 4, 5, 6 is axial, i.e. perpendicular to the plane of the drawing. In known fashion they have for that purpose, adjacently and alternatingly, inflow and outflow conduits that are separated by porous filtrationally effective longitudinal walls, the inflow channels being open on the inflow side (here, at the end face) and closed on the outflow side, and the outflow conduits being closed on the inflow side and open on the outflow side. The inflow and outflow conduits are arranged in checkerboard fashion.

The central first filter element 2 is equipped (although this is not depicted here in detail) at both end faces with electrical terminals like those described in EP 0 943 593 A1. First filter element 2 can be connected to an electrical circuit and thus acted upon by current. The electrical resistance of first filter element 2 is such that when acted upon by current it heats up in such a way that soot which has deposited there combusts.

Second filter elements 3, 4, 5, 6 are in contact against first filter element 2 by way of a contact layer (not depicted here in detail). They have no electrical terminals. Depending on the type of contact layers and the thermal conductivity of second filter elements 3, 4, 5, 6, the latter are concurrently heated when first filter element 2 is acted upon by current; the heating can even proceed to the point that at least partial burn-off of the soot occurs in these filter elements 3, 4, 5, 6 as well. If this is to be encouraged, second filter elements 3, 4, 5, 6 can also be made from an electrically conductive ceramic material.

Filter element group 1 is intended to be incorporated into the filter housing of a filter device, the filter device then being installed in the exhaust system of a diesel engine. Soot cleaning is usually performed by way of corresponding exhaust gas processing, for example elevating the exhaust gas temperature to a level at which the soot combusts. If the vehicle in question is used only at low load or in short-distance driving, the risk exists that operating states in which the exhaust gas temperature is sufficient for combustion of the carbon will not be attained. In that case electrical current is delivered to first filter element 2 so that it heats up to a temperature at which the soot combusts.

Figure 2:
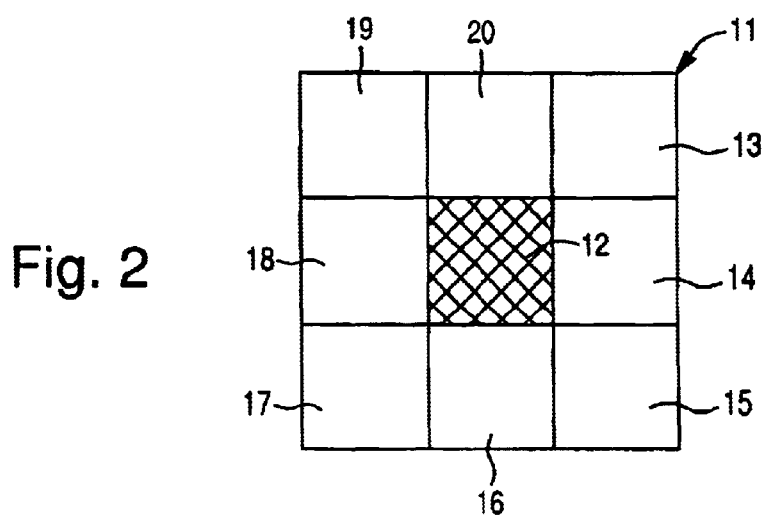
FIG. 2 shows a second filter element group in an end view.

The exemplary embodiment of FIG. 2 shows a filter element group 11 in which a first filter element 12 is arranged centrally and is surrounded by eight second filter elements 13 through 20. In contrast to the embodiment of FIG. 1, here filter elements 12 through 20 have a square cross section, so that filter element group 11 also has a square cross section. Except for the differences in cross section, the description of the exemplary embodiment shown in FIG. 1 is applicable.

Figure 3:
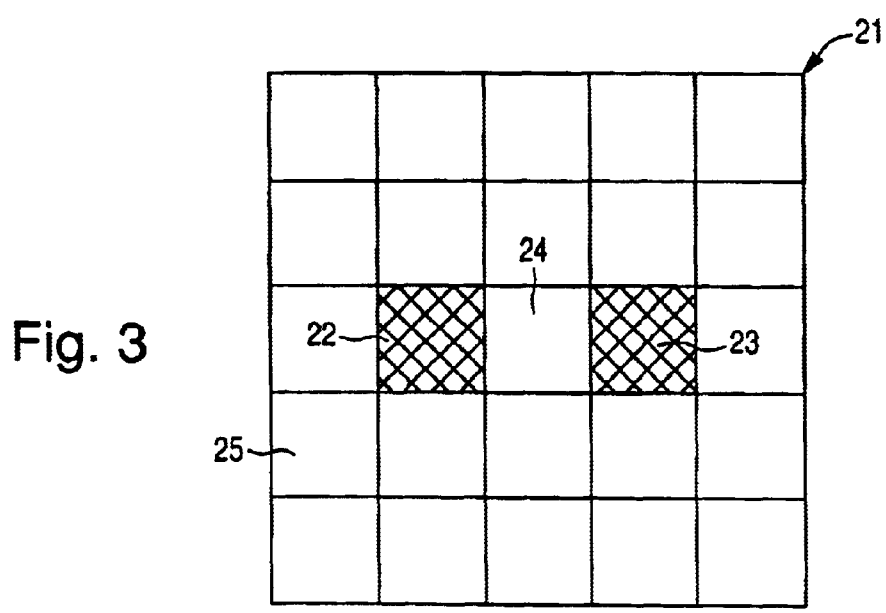
FIG. 3 shows a third filter element group in an end view.

FIG. 3 depicts a further exemplary embodiment of a filter element group 21 in which two first filter elements 22, 23 are arranged at a distance from one another and separated by a second filter element 24. First filter elements 22, 23 are surrounded by further second filter elements (labeled 25 by way of example), thus yielding an overall square cross section for filter element group 21. Filter elements 22, 23, 24, 25 themselves have a square cross section.

With regard further to first and second filter elements 22, 23, 24, 25, the reader is referred to the description of filter elements 2 through 6 shown in FIG. 1. In the case of filter element group 21, the possibility exists of performing cleaning of first filter elements 22, 23 independently of one another and at different times, by providing a corresponding circuit.

Figure 4:
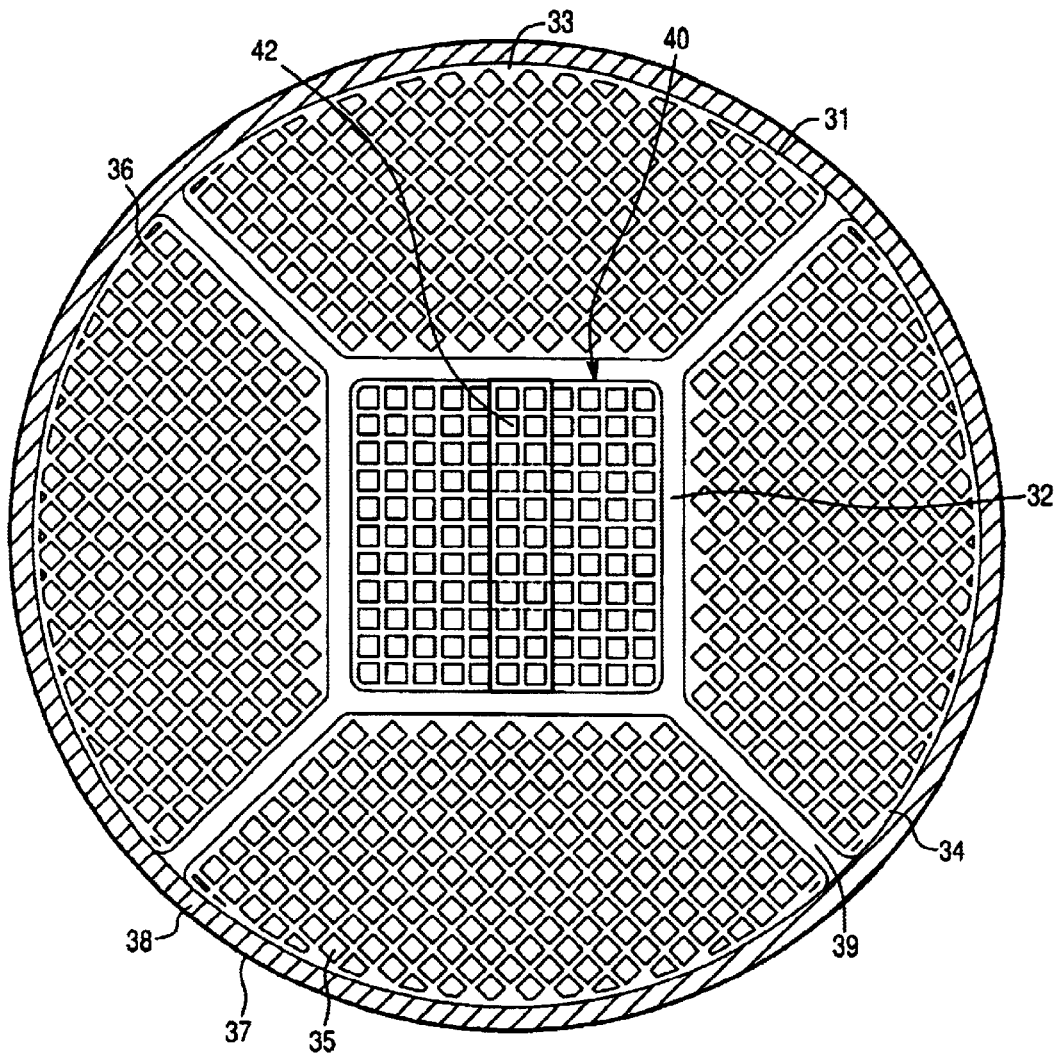
FIG. 4 shows a fourth filter element group, having an electrical terminal piece, in an end view.

Filter element group 31 depicted in FIG. 4 has an overall circular cross section and is similar to filter element group 1 shown in FIG. 1, with the difference that the first, center filter element 32 has a square cross section. It is surrounded by four shell-shaped second filter elements 33, 34, 35, 36. Filter element group 31 is surrounded by a circular housing 37, an insulation layer 38 being present between filter element group 31 and housing 37. The individual filter elements 32, 33, 34, 35, and 36 are separated from one another by contact layers (labeled 39 by way of example). Contact layers 39 have a lower electrical conductivity than filter elements 32, 33, 34, 35, 36.

Figure 4A:
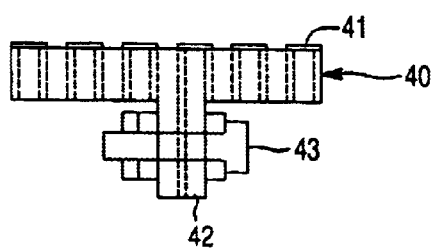
FIG. 4A shows a side view of the electric conductor flange.

Placed onto the end face of first filter element 32 is a terminal piece 40 that has the same cross section as first filter element 32 and, as depicted, comprises square inflow conduits. FIG. 4A shows the terminal piece 40 rotated 90 degrees. Terminal piece 40 is connected via contact layer elements (labeled 41 by way of example) to the end face of first filter element 32. On the outer side, terminal piece 40 has a connector flange 42 that is equipped with a connector screw 43 for attachment of an electrical cable. It is understood that a corresponding terminal piece is present on the other end face of first filter element 32.

Figure 5:
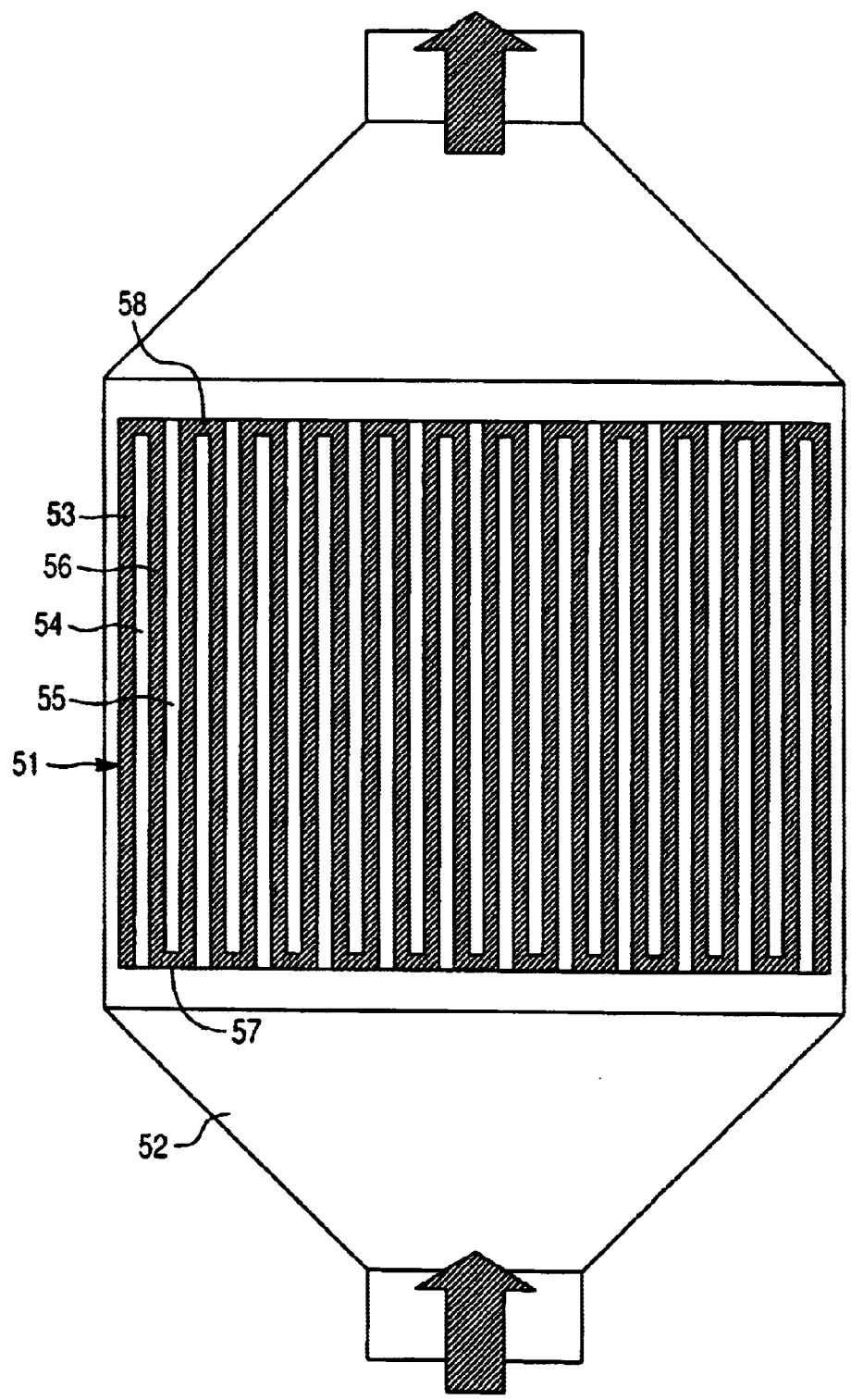
FIG. 5 shows a longitudinal section through a filter housing having a fifth filter element group.

Filter element group 51 depicted in FIG. 5 is housed in a housing 52 that first expands conically in the flow direction and then contracts conically again. Only a single filter element 53, which extends over the entire width of housing 52, is shown in section. The other filter elements are not visible.

The sectioned depiction shows clearly that inflow conduits (labeled 54 by way of example) and outflow conduits (labeled 55 by way of example) alternate in the section plane. Inflow conduits 54 and outflow conduits 55 are separated by longitudinal walls (labeled 56 by way of example), longitudinal walls 56 being porous and thus filtrationally effective. In the inflow direction, outflow conduits 55 are closed off by end walls (labeled 57 by way of example) which are gas-tight, i.e. through which flow cannot occur. On the outflow side, inflow conduits 54 are closed off by corresponding end walls (labeled 58 by way of example), so that the gas flowing into inflow conduits 54 is forced to flow through longitudinal walls 56 and then to flow out of filter element 53 through outflow conduits 55.

What is claimed is:

1. A filter device having filter elements made of ceramic material which are combined into at least one filter group, wherein said filter elements lie side by side next to one another and can be flowed through in parallel,
    wherein some of said filter elements of said filter element group have electric terminals for connection with an electrical energy source, and at least one of said filter elements is made of electrically conductive ceramic material,
    wherein said filter elements comprise first filter elements having electrical terminals, and second filter elements not having electrical terminals, said first filter elements being arranged at the center of said filter group.

2. A filter device having filter elements made of ceramic material which are combined into at least one filter group, wherein said filter elements lie side by side next to one another and can be flowed through in parallel,
    wherein some of said filter elements of said filter element group have electric terminals for connection with an electrical energy source, and at least one of said filter elements is made of electrically conductive ceramic material,
    wherein said filter elements comprise at least one first filter element having electrical terminals, and at least one second filter element not having electrical terminals,
    wherein said first filter element is surrounded by said second filter elements.

3. A filter device having filter elements made of ceramic material which are combined into at least one filter group, wherein said filter elements lie side by side next to one another and can be flowed through in parallel,
    wherein some of said filter elements of said filter element group have electric terminals for connection with an electrical energy source, and at least one of said filter elements is made of electrically conductive ceramic material,
    wherein said filter elements comprise first filter elements having electrical terminals, and second filter elements not having electrical terminals,
    wherein said second filter elements are comprised of non-conductive material.

4. A filter device having filter elements made of ceramic material,
    the filter elements being combined into at least one filter element group, said filter elements in said filter element group being positioned adjacent to one another, so that said filter elements are exposed to parallel flow, the filter element group comprising at least one first filter element, and at least one second filter element,
    said first filter element being comprised of electrically conductive ceramic material, and having electrical terminals for connection to an electrical energy source,
    said second filter element comprised of ceramic material which is not electrically conductive or has a lower electrical conductivity than the ceramic material of said first filter element.

5. The filter device of claim 4, wherein said second filter element is side by side with said first filter element,
    said second filter elements has an electrically conductive contact with at least one said first filter element.

6. The filter device of claim 4, wherein said first filter element is arranged in a center area of said filter element group.

7. The filter device of claim 4, wherein at least two of said first filter elements are separated by at least one of said second filter elements in said filter element group.

8. The filter device of claim 4, wherein said first filter element is surrounded by at least one of said second filter elements.

9. The filter device of claim 4, wherein the thermal conductivity of said second element is greater than or less than the thermal conductivity of said first filter element.

10. The filter device of claim 4, wherein each of said filter elements comprise inflow conduits and outflow conduits,
    each inflow conduit is next to, and alternates with an outflow conduit, said inflow and said outflow conduits are separated by porous walls,
    each inflow conduit has an opening on an inflow side and is closed on an outflow side,
    each outflow conduit is closed on an inflow side and has an opening on an outflow side.

11. The filter device of claim 4, wherein said filter elements have outer gas tight walls.

12. The filtration device of claim 4, wherein said outer walls have a configuration selected from a group consisting of:
    rectangular, square, oval, round and shell-shaped.

13. The filtration device of claim 4, wherein each filter element group is surrounded by a housing,
    said housing having a gas inlet and a gas outlet.

14. The filtration device of claim 4, wherein contact layers are disposed between adjacent filter elements,
    said contact layers having an expansion coefficient that is substantially the same as the expansion coefficient of said first and second filter elements.

15. A filter device having filter elements made of ceramic material,
    the filter elements being combined into at least one filter element group, said filter elements in said filter element group being positioned adjacent to one another, so that said filter elements are exposed to parallel flow, the filter element group comprising at least one first filter element, and at least one second filter element, said first filter element being comprised of electrically conductive ceramic material, and having electrical terminals for connection to an electrical energy source, a contact layer separates said first filter from said second filter elements, said contact layers having an electrical conductivity that is less than the electrical conductivity of the ceramic material forming said first filter element.

16. The filter device of claim 15, wherein said contact layers are comprised of the same ceramic material as said first and second filter elements.

17. The filter device of claim 16, wherein said contact layers connect said filter elements.

18. The filter device of claim 17, wherein said contact layers have no surface connection to said filter elements.

19. The filter device of claim 18, wherein said contact layers have a thermal conductivity that is substantially the same as the thermal conductivity of said first or said second filter elements.

20. The filter device of claim 19, wherein said first filter element is arranged in a center area of said filter element group.

21. The filter device of claim 19, wherein at least two of said first filter elements are separated by at least one of said second filter elements in said filter element group.

22. The filter device of claim 21, wherein said first filter element is surrounded by at least one of said second filter elements.

23. The filter device of claim 22, wherein the thermal conductivity of said second element is greater than or less than a the thermal conductivity of said first element.

24. The filter device of claim 23, wherein each of said filter elements comprise inflow conduits and outflow conduits, each inflow conduit is next to, and alternates with an outflow conduit, said inflow and said outflow conduits are separated by porous walls, each inflow conduit has an opening on an inflow side and is closed on an outflow side, each outflow conduit is closed on an inflow side and has an opening on an outflow side.

25. The filter device of claim 24, wherein said inflow and outflow conduits have a square cross section.

26. The filter device of claim 25, wherein said filter elements have outer gas tight walls.

27. The filtration device of claim 26, wherein said outer walls have a configuration selected from a group consisting of:

rectangular, square, oval, round and shell-shaped.

28. The filtration device of claim 27, wherein a housing surrounds said filter element groups, said housing having a gas inlet and a gas outlet.

29. The filtration device of claim 28, wherein multiple filter element groups are present, a separate housing surrounds each of said filter element groups.

30. The filtration device of claim 29, wherein said contact layers having an expansion coefficient that is substantially the same as the expansion coefficient of said first and second filter elements.

* * * * *